US005265001A

United States Patent [19]

Yasumura

[11] Patent Number: 5,265,001

[45] Date of Patent: Nov. 23, 1993

[54] POWER SUPPLY CIRCUIT WITH SWITCHING FREQUENCY OF SATURABLE FERRITE TRANSFORMER CONTROLLED BY CLASS A AMPLIFIER

[75] Inventor: Masayuki Yasumura, Kanagawa, Japan

[73] Assignee: Sony Corporation, Tokyo, Japan

[21] Appl. No.: 892,282

[22] Filed: Jun. 2, 1992

[30] Foreign Application Priority Data

Jun. 7, 1991 [JP] Japan .................................. 3-163757

[51] Int. Cl.$^5$ .............................................. H02M 7/517

[52] U.S. Cl. .......................................... 363/49; 363/98; 363/132

[58] Field of Search ...................... 363/17, 49, 98, 132; 323/901

[56] References Cited

U.S. PATENT DOCUMENTS

| | | | |
|---|---|---|---|
| 4,047,089 | 9/1977 | Suzuki et al. | 363/49 |
| 4,533,836 | 8/1985 | Carpenter et al. | 363/17 |
| 4,887,199 | 12/1989 | Whittle | 363/49 |
| 4,937,728 | 6/1990 | Leonardi | 363/49 |

*Primary Examiner*—Jeffrey Sterrett

*Attorney, Agent, or Firm*—Lewis H. Eslinger; Jay H. Maioli

[57] ABSTRACT

A power supply circuit securing a stabilized output DC voltage despite increases in the input DC voltage, uses an economical electromagnetic relay, in which a control current Ic' is supplied from a switching amplifier 1 to a control winding Nc' of a saturable ferrite transformer (CDT'). A class A amplifier formed of resistors $R_1$ to $R_3$ and a transistor $Q_8$ of the switching amplifier 1 amplifies a DC input voltage E1 and controls the switching frequency ranging from 100 to 200 KHz according to input DC voltage ranging from 10 to 32V. Resistors $R_4$ and $R_5$ and a transistor $Q_7$ for the switching amplifier 1 form a switching circuit of the control current Ic', while resistors $R_6$ and $R_7$ and a transistor $Q_8$ form a switching circuit for the starting currents of switching transistors $Q_1$ and $Q_3$ of a first and a third half-bridge resonant converter.

3 Claims, 3 Drawing Sheets

POWER SUPPLY CIRCUIT WITH SWITCHING FREQUENCY OF SATURABLE FERRITE TRANSFORMER CONTROLLED BY CLASS A AMPLIFIER

BACKGROUND OF THE INVENTION

1. Field of the Invention

The present invention relates to a power supply circuit and, more particularly, to a switching power supply circuit which operates with a wide range of input DC voltage and is economical.

2. Description of the Related Art

FIG. 4 shows a switching power supply circuit (F-Z power supply) for DC operation incorporating a standby power supply in a power supply system of a conventional fixed switching frequency and series resonance frequency control type. In this power supply circuit, an input DC voltage E1 of 10.5 to 24V from a battery or the like is applied to the collectors of switching transistors $Q_1$ and $Q_3$ of first and third half-bridge resonant converters, respectively. The first half-bridge resonant converter is formed of the transistor $Q_1$, a capacitor $C_{B1}$, a portion of the primary winding of a converter drive transformer CDT, etc., while a second half-bridge resonant converter is formed of a transistor $Q_2$, a capacitor $C_{B2}$, a portion of the primary winding of the converter drive transformer CDT, etc.

Further, the third half-bridge resonant converter is formed of the transistor $Q_3$, a capacitor $C_{B3}$, a portion of the secondary winding of the transformer CDT, etc., while a fourth half-bridge resonant converter is formed of a transistor $Q_4$, a capacitor $C_{B4}$, a portion of the secondary winding of the transformer CDT, etc.

In this case, larger collector currents flow through the transistors $Q_1$ to $Q_4$ the lower the input DC voltage is. Therefore, those of high current amplification are selected. Further, in order to reduce the drive currents of the switching transistors $Q_1$ to $Q_4$, starting currents are supplied thereto through starting resistors $R_{S1}$ to $R_{S4}$ as described later, and accordingly, the DC current flowing into the collector at this time becomes $Ic = h_{FE} \cdot I_B$ (where $h_{FE} = 200$ to 300).

The emitter of the transistor $Q_1$ and the collector of the transistor $Q_2$ are connected to one end of the secondary winding $N_1'$ of a saturable power regulation transformer PRT through a capacitor $C_1$, and the emitter of the transistor $Q_3$ and the collector of the transistor $Q_4$ are connected to the other end of the secondary winding $N_1'$ of the transformer PRT through a relay contact ry1 of a two-circuit one-contact electromagnetic relay RY. From the secondary winding $N_3$ of the transformer PRT, a DC voltage of 15V is taken out through diodes $D_1$ and $D_4$ and a DC voltage of 7.5V is taken out through diodes $D_2$ and $D_3$. From the secondary winding $N_2$ of the transformer PRT, a DC voltage $E_0$ of 115V is taken out through a bridge type rectifier D. This DC voltage $E_0$ is also applied to the control winding Nc of the transformer PRT.

In order to reduce the driving power, the bases of the switching transistor $Q_1$ and $Q_3$ of the first and third half-bridge resonant converters are supplied with a DC voltage of 12V through a relay contact ry2 of the two-circuit one-contact electromagnetic relay RY and the starting resistors $R_{S1}$ and $R_{S3}$, while the emitters of the switching transistors $Q_1$ and $Q_3$ are connected with the bases of the second and fourth transistors $Q_2$ and $Q_4$ through the starting resistors $R_{S2}$ and $R_{S4}$, respectively.

Here, a current of 5V/50 mA is supplied to a remote control receiver, not shown, and a transistor $Q_5$ is turned on by an on signal of the main power supply from the remote control receiver. Thereby, the electromagnetic relay RY is driven and the DC voltage E1 of 12V is supplied to the bases of the switching transistors $Q_1$ and $Q_3$ through the relay contact ry2 and starting resistors $R_{S1}$ and $R_{S3}$.

However, since the above described conventional power supply circuit is formed with current resonant converters of a fixed switching frequency type, the range within which stabilization of the DC voltage $E_0$ is secured is the range of the DC voltage E1 from 10.5 to 24V. When a battery used is that of a rated voltage of 24V as is the case with a bus or a ship, the battery voltage varies over the range of 24±8V. Therefore, in the range of the input DC voltage from 24 to 32V, there arises a difficulty that stabilization of the DC voltage $E_0$ cannot be secured as indicated in FIG. 3 by the broken line.

Further, at the time when the circuit is in the standby state and the electromagnetic relay RY is off, small currents flow from the transistor $Q_1$ to the transistor $Q_2$ and from the transistor $Q_3$ to the transistor $Q_4$. In order to prevent the power loss in the standby state, however, a problem arises that a heavy and expensive electromagnetic relay RY of a two-circuit one-contact type must be selected.

Further, since the resonant current I' flowing through the secondary winding $N_1'$ of the saturable power regulation transformer PRT becomes a high-frequency current of $20A_{P-P}$ when the main load current is 45W, an electromagnetic relay RY of which the contact has a large current capacity is required.

SUMMARY OF THE INVENTION

In view of the above mentioned problems, the present invention has as its object the provision of a power supply circuit by which stabilization of output DC voltage can be secured despite great variations in the input DC voltage and which is simple in circuit configuration and uses a small, light, and economical electromagnetic relay.

In order to achieve the above mentioned object, the power supply circuit of the invention comprises transistors for switching an input DC voltage and a saturable ferrite transformer, resistors for supplying the transistors with starting currents corresponding to the input DC voltage, and a switching circuit which, when the power supply is off, cuts off a control current of the saturable ferrite transformer and also cuts off the starting currents and, when the power supply is on, amplifies the input DC voltage and supplies the amplified voltage to a control winding of the saturable ferrite transformer and also allows the starting currents to flow.

In the present invention with the above described arrangement, since the control current of the saturable ferrite transformer is amplified according as the input DC voltage rises, stabilization of the output DC voltage can be secured. Further, since the starting currents of the transistors are on/off controlled by a switching circuit, the conventionally used heavy and expensive two-circuit one-contact current power relay can be eliminated and an economical and small electromagnetic relay can be used, instead.

DESCRIPTION OF THE PREFERRED EMBODIMENTS

Figure 1:
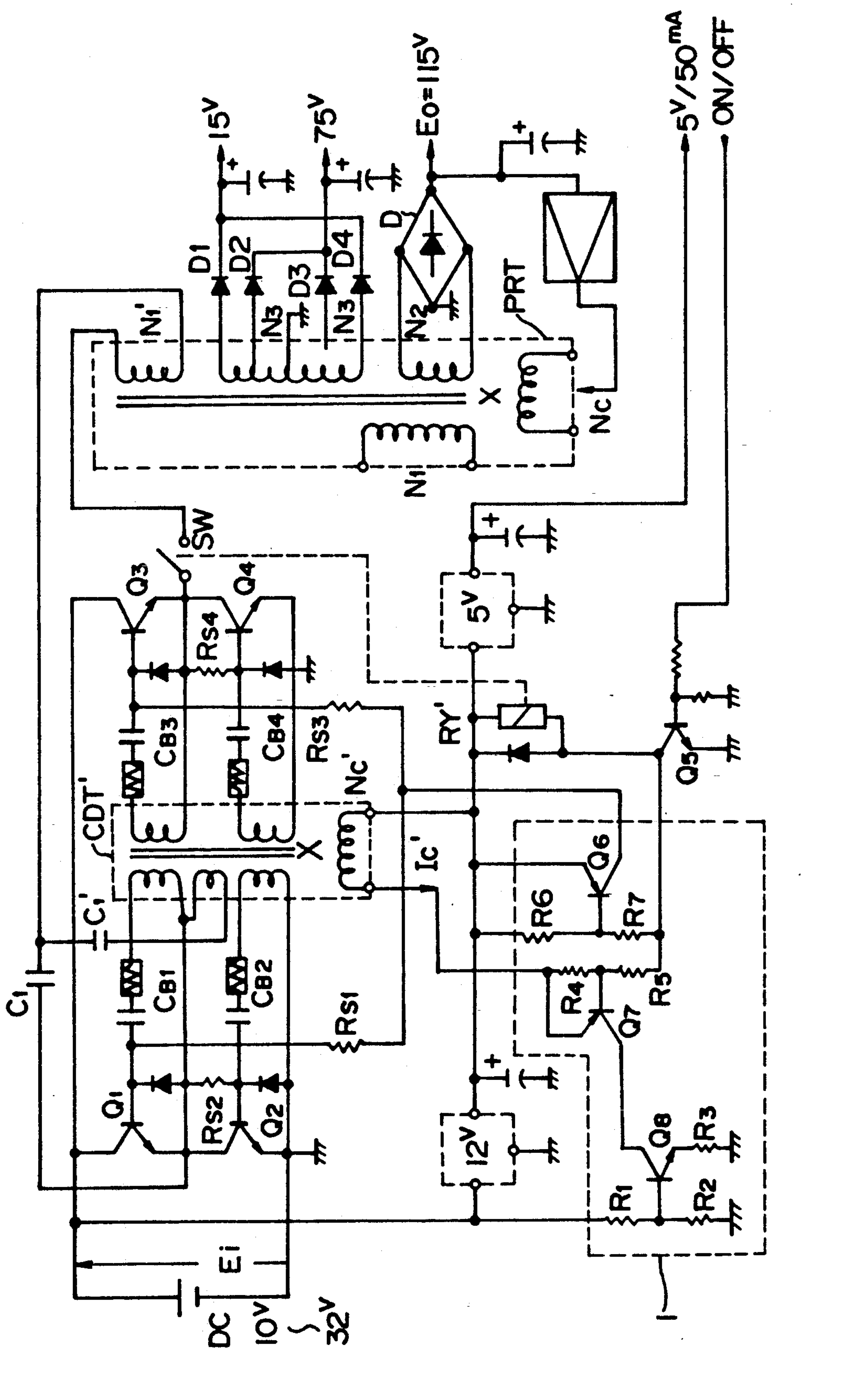
FIG. 1 is a circuit diagram showing an embodiment of a power supply circuit according to the present invention.
Figure 2:
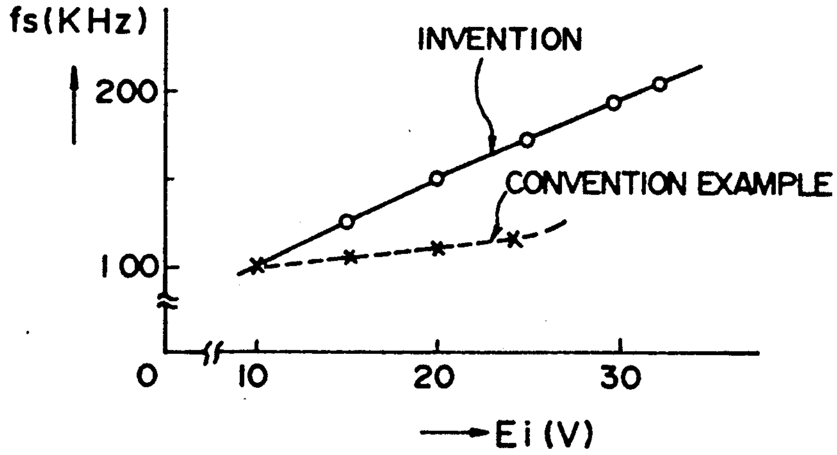
FIG. 2 is a graph showing an example of comparison of frequency characteristics of the power supply circuit of FIG. 1 and that of a conventional type.
Figure 3:
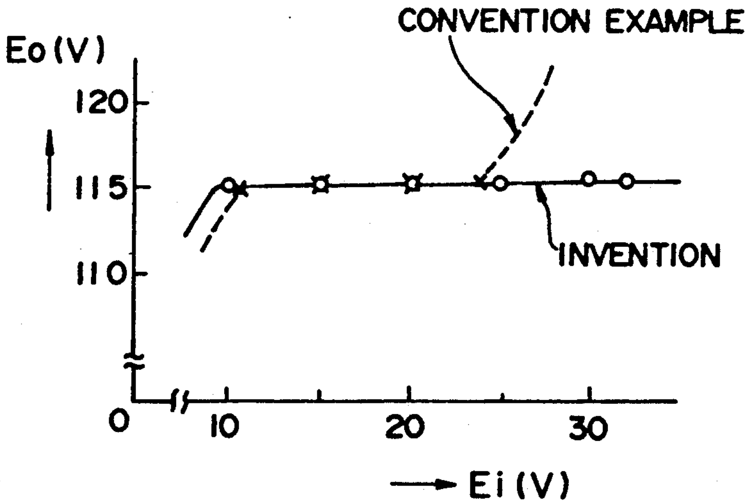
FIG. 3 is a graph showing an example of comparison of voltage stabilization characteristics of the power supply circuit of FIG. 1 and that of a conventional type.
Figure 4:
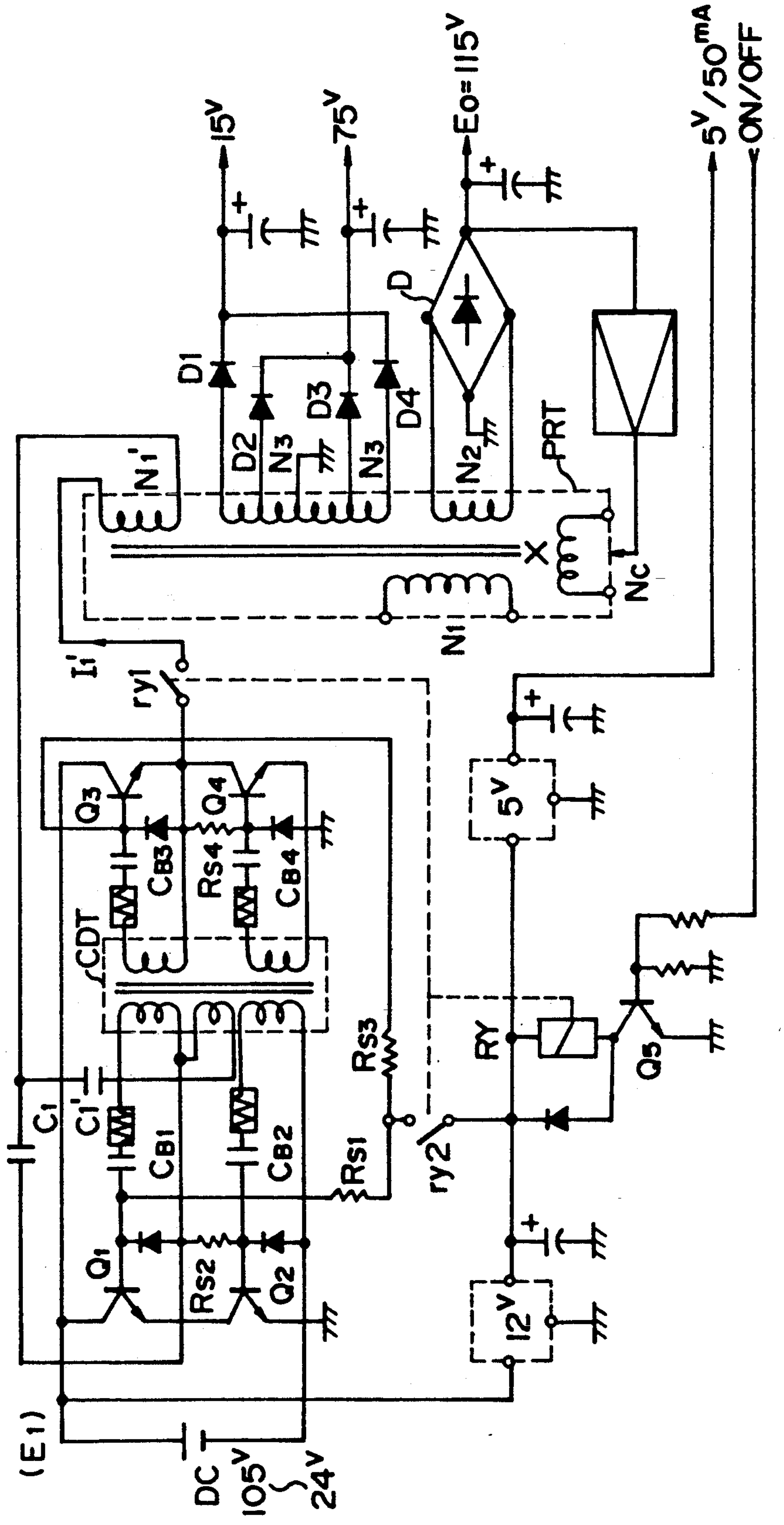
FIG. 4 (PRIOR ART)
FIG. 4 is a circuit diagram showing a conventional power supply circuit.

An embodiment of the present invention will be described below with reference to the accompanying drawings. FIG. 1 is a circuit diagram showing an embodiment of the power supply circuit according to the present invention, FIG. 2 is a graph showing an example of comparison of frequency characteristics of the power supply circuit of FIG. 1 and that of a conventional type, FIG. 3 is a graph showing an example of comparison of voltage stabilization characteristics of the power supply circuit of FIG. 1 and that of a conventional type. Component members in FIG. 1 corresponding to those shown in FIG. 3 are denoted by corresponding reference numerals.

Referring to FIG. 1, in the first to fourth half-bridge resonant converters, an input DC voltage E1 of 10.5 to 32V from a battery or the like is applied to the collectors of the switching transistors $Q_1$ and $Q_3$ of the first and third half-bridge resonant converters, and a saturable ferrite transformer CDT' of which the switching frequency is controllable over a wide range is used therein in place of a converter drive transformer CDT of which switching frequency is fixed used in the conventional power supply circuit. A control current Ic' from a switching amplifier 1 which is indicated enclosed by a broken line is applied to the control winding Nc' of the saturable ferrite transformer CDT' whereby the switching frequency of the saturable ferrite transformer CDT' is controlled.

The first half-bridge resonant converter is formed of the transistor $Q_1$, a capacitor $C_{B1}$, a portion of the primary winding of the saturable ferrite transformer CDT', etc., the second half-bridge resonant converter is formed of a transistor $Q_2$, a capacitor $C_{B2}$, a portion of the primary winding of the transformer CDT', etc., the third half-bridge resonant converter is formed of the transistor $Q_3$, a capacitor $C_{B3}$, a portion of the secondary winding of the transformer CDT', etc., and the fourth half-bridge resonant converter is formed of a transistor $Q_4$, a capacitor $C_{B4}$, a portion of the secondary winding of the transformer CDT', etc.

The emitter of the transistor $Q_1$ and the collector of the transistor $Q_2$ are connected to one end of the secondary winding $N_1'$ of a saturable power regulation transformer PRT through a capacitor $C_1$, and the emitter of the transistor $Q_3$ and the collector of the transistor $Q_4$ are connected to the other end of the secondary winding $N_1'$ of the transformer PRT through a relay contact SW of a one-circuit one-contact electromagnetic relay RY'. From the secondary winding $N_3$ of the transformer PRT, a DC voltage of 15V is taken out through diodes $D_1$ and $D_4$ and a DC voltage of 7.5V is taken out through diodes $D_2$ and $D_3$. From the secondary winding $N_2$ of the transformer PRT, a DC voltage $E_0$ of 115V is taken out through a bridge type rectifier D. This DC voltage $E_0$ is also applied to the control winding Nc of the transformer PRT.

Now, the structure of the switching amplifier 1 will be described in detail. The positive terminal of the battery is grounded through voltage dividing resistors $R_1$ and $R_2$ and the junction point of the voltage dividing resistors $R_1$ and $R_2$ is connected to the base of an NPN transistor $Q_8$. The collector of the transistor $Q_8$ is connected to the collector of a PNP transistor $Q_7$ and the emitter of transister $Q_8$ is grounded through a resistor $R_3$ and, thus, the resistors $R_1$ to $R_3$ and the transistor $Q_8$ form a class A amplifier.

A DC voltage of 12V is connected with one end of a resistor $R_6$, the emitter of a PNP transistor $Q_6$, one end of the control winding Nc' of the saturable ferrite transformer CDT', and one end of the coil of the one-circuit one-contact electromagnetic relay RY'. The other end of the control winding Nc' (control current Ic') is connected to one end of a resistor $R_4$ and the emitter of the transistor $Q_7$, while the other end of the resistor $R_4$ and the base of the transistor $Q_7$ are connected with the collector of a relay driving transistor $Q_5$ through a resistor $R_5$. The base of the transistor $Q_5$ is applied with an on/off signal of the main power supply from a remote control receiver, not shown. Thus, the resistors $R_4$ and $R_5$ and the transistor $Q_7$ form a switching circuit for the control current Ic'.

The other end of the resistor $R_6$ is connected with the base of the transistor $Q_6$ and one end of a resistor $R_7$, while the other end of the resistor $R_7$ and the other end of the coil of the one-circuit one-contact relay RY' are connected with the collector of the transistor $Q_5$. In order to reduce the driving power, the bases of the switching transistor $Q_1$ and $Q_3$ of the first and third half-bridge resonant converters are applied with the collector output of the transistor $Q_6$ through the starting resistors $R_{S1}$ and $R_{S3}$, while the emitters of the switching transistors $Q_1$ and $Q_3$ are connected with the bases of the second and fourth transistors $Q_2$ and $Q_4$ through the starting resistors $R_{S2}$ and $R_{S4}$, respectively. Thus, the resistors $R_6$ and $R_7$ and the transistor $Q_6$ form a switching circuit of the starting currents of the switching transistors $Q_1$ and $Q_3$ of the first and third half-bridge resonant converters.

Operation of the embodiment arranged as above will now be described. First, the class A amplifier formed of the resistors $R_1$ to $R_3$ and the transistor $Q_8$ amplifies the DC input voltage E1 and controls the switching frequency ranging from 100 to 200 KHz according to the range of DC voltages from 10 to 32V as indicated in FIG. 2 by the solid line. In the switching circuit of the control current Ic' formed of the resistors $R_4$ and $R_5$ and the transistor $Q_7$, the transistor $Q_7$ is off when the main power supply is off, i.e., when the transistor $Q_5$ is off. When the main power supply is turned on and the transistor $Q_5$ is turned on, the transistor $Q_7$ is turned on and the control current Ic' is allowed to flow through the control winding Nc' of the saturable ferrite transformer CDT'. Therefore, as indicated in FIG. 3 by the solid line, it is achieved to secure the output voltage stability over a wide range of the input voltages from 10 to 32V.

In the switching circuit of starting currents formed of the resistors $R_6$ and $R_7$ and the transistor $Q_6$, when the main power supply is off, i.e., when the transistor $Q_5$ is off, the transistor $Q_6$ is off and the starting currents do not flow. However, when the main power supply is turned on and the transistor $Q_5$ is turned on, the transistor $Q_6$ is turned on and, consequently, the starting currents are supplied to the switching transistors $Q_1$ and $Q_3$ through the transistor $Q_6$ and the starting resistors $R_{S1}$ and $R_{S3}$. Since, as described above, the power supply circuit can be arranged not using a heavy and expensive electromagnetic relay RY of a two-circuit one-contact type as was the case with the conventional type but using a small and light electromagnetic relay RY' of the one-circuit one-contact type, the cost of manufacture can be reduced.

According to the present invention as described above, since the control current of the saturable ferrite transformer is amplified according as the input DC voltage rises, stabilization of the output DC voltage can be secured. Further, since the starting currents of the transistors are turned on/off by the switching circuit, a heavy and expensive two-circuit one-contact electromagnetic relay need not be used but an economical electromagnetic relay can be used.

What is claimed is:

1. A power supply circuit comprising:

a saturable ferrite transformer having a control winding;

transistors connected to said saturable ferrite transformer for switching an input DC voltage at a frequency in response to a voltage level applied to said control winding of said saturable ferrite transformer;

resistors for supplying said transistors with starting currents corresponding to the input DC voltage;

a first switching circuit for cutting off said starting currents when the power supply is off and for allowing said starting currents to flow when the power supply is on; and a second switching circuit having an input connected to the input DC voltage and an output connected to said control winding of said saturable ferrite transformer, for amplifying and applying the input DC voltage to said control winding when the power supply is on and for cutting off current flow in said control winding when the power supply is off.

2. The power supply circuit according to claim 1, wherein said second switching circuit comprises a class A amplifier.

3. The power supply circuit according to claim 1 further comprising an electromagnetic relay for disconnecting a power supply output from said transistors when the power supply is off.

* * * * *